Feb. 17, 1959    J. E. PARETTA    2,873,477
TIRE RECAPPING MOLD

Filed Dec. 6, 1955                    2 Sheets-Sheet 1

INVENTOR.
JOHN E. PARETTA
BY Robert T. Casey
HIS ATTORNEY

Feb. 17, 1959  J. E. PARETTA  2,873,477
TIRE RECAPPING MOLD

Filed Dec. 6, 1955  2 Sheets-Sheet 2

INVENTOR.
JOHN E. PARETTA
BY Robert T. Casey
HIS ATTORNEY

United States Patent Office 2,873,477
Patented Feb. 17, 1959

2,873,477

TIRE RECAPPING MOLD

John E. Paretta, Bristol, Conn.

Application December 6, 1955, Serial No. 551,324

3 Claims. (Cl. 18—18)

My invention relates to molds and molding methods for automobile and other vehicle tires and particularly to molds and molding methods for use in the process of "recapping" such tires, that is, in replacing the worn-away peripheral portion, including the tread portion, of such tires with new material bonded and vulcanized thereto.

The process of recapping a tire involves a number of steps, which relate to (1) preparing the tire or "casing," (2) placing the unvulcanized or raw rubber replacement material on the casing, and (3) impressing a tread design on the raw rubber and vulcanizing it. Steps in the first two of these classes do not require heating of the tire to any great degree and are usually performed manually with suitable tools. The third class of steps requires that the prepared tire and recap-strip be placed in a suitable mold having the desired tread matrix, and heated therein under pressure for a predetermined length of time.

According to prior practice, tires are prepared and provided with a raw rubber strip, at one area of a recapping plant, and as the vulcanization of a prior tire is completed and a mold becomes available, a prepared tire is selected and carried to the mold and inserted therein. This method requires that the mold be left open and unused a short time during each cycle while a tire is being obtained and carried to the mold, thus reducing the production rate of the mold.

It is an object of the present invention to provide an improved method and means of molding for recapping tires wherein a prepared tire is always available at each mold location when the mold becomes available and the time required for a mold to be left open or unused between molding cycles is reduced to only a few seconds.

The prior art method furthermore, starts each vulcanizing cycle with a prepared tire which is at, or below, room temperature. The total time, therefore, for vulcanizing is the time required to raise the temperature of the tire from at, or below room temperature to vulcanizing temperature, plus the period of time which the tire must be maintained at such vulcanizing temperature.

It is an object of the present invention to provide an improved method and means of molding for recapping tires wherein each vulcanizing cycle is started with a tire which is considerably above room temperature, whereby the time required to elevate the temperature of the tire to vulcanizing temperature is reduced and the production rate capacity of the mold is increased.

In the course of recapping tires, a certain number of tires are encountered which contain an amount of moisture such that during the molding cycle steam is generated which interferes with the proper formation of the tread in the matrix and the vulcanization thereof. In addition, a certain number of tires are encountered which include in the material thereof, various synthetic or plastic fibers as reinforcing agents. Certain of these fibers have characteristics such that during the use of the tire on an automobile or other vehicle, the effect of constant centrifugal force, together with the continued flexing causes the fibers to elongate and the over-all size of the tire to increase perceptibly. When it is attempted to place such a tire in a mold for the purpose of vulcanizing a recap strip thereon, it is found that an imperfect fit results and it is necessary to heat the tire at a reduced level for a certain time to release the stresses in such fibers and allow them to return or "shrink" to their original length so that the tire can return to its proper size. This delays the start of that particular molding cycle and prolongs the time required to complete the operation.

It is an object of my invention to provide a method and means of molding for recapping tires whereby tires having an unusual amount of moisture or including synthetic fibers requiring "pre-shrinking" are prepared for molding in the course of the regular molding cycle before insertion in the mold.

It is a further important object of my invention to provide an improved tire recapping mold including means for storing one or more tires to be recapped, with consequent saving of important space.

It is a further object of my invention to provide a method and means of molding for recapping tires which produces recapped tires of uniformly high quality and with tread patterns with sharper cut lines than those produced by prior methods.

It is a further object of my invention to provide a simple, rugged, and relatively inexpensive attachment for tire recapping molds by which my improved method of molding may be practiced with a standard type of tire recapping mold.

In accordance with my invention, I provide a method of recapping a series of automobile or other vehicle tires including the steps of placing a tire having a strip of unvulcanized rubber on the periphery thereof in close proximity to a tire recapping mold in which a preceding process tire is being vulcanized for a substantial length of time whereby the said tire is pre-heated by radiated and convected heat from such mold, placing it within such mold upon completion of the vulcanization and removal of the said preceding tire, and heating it therein for a predetermined time to vulcanize said strip of rubber to said tire, and removing the recapped tire from the mold.

In accordance with my invention I also provide a tire recapping mold including a molding chamber for receiving a first tire and for molding a renewed tread thereon and having heating means for vulcanizing such tread, and a generally circular supporting bracket for supporting a second, prepared tire immediately above the molding chamber, whereby the second tire is pre-heated by radiated and convected heat from the molding chamber for the same period of time that the first tire is being vulcanized.

My invention will be more fully understood from the following detailed description taken in conjunction with the accompanying drawings, and its scope will be pointed out in the appended claims.

Figure 1:
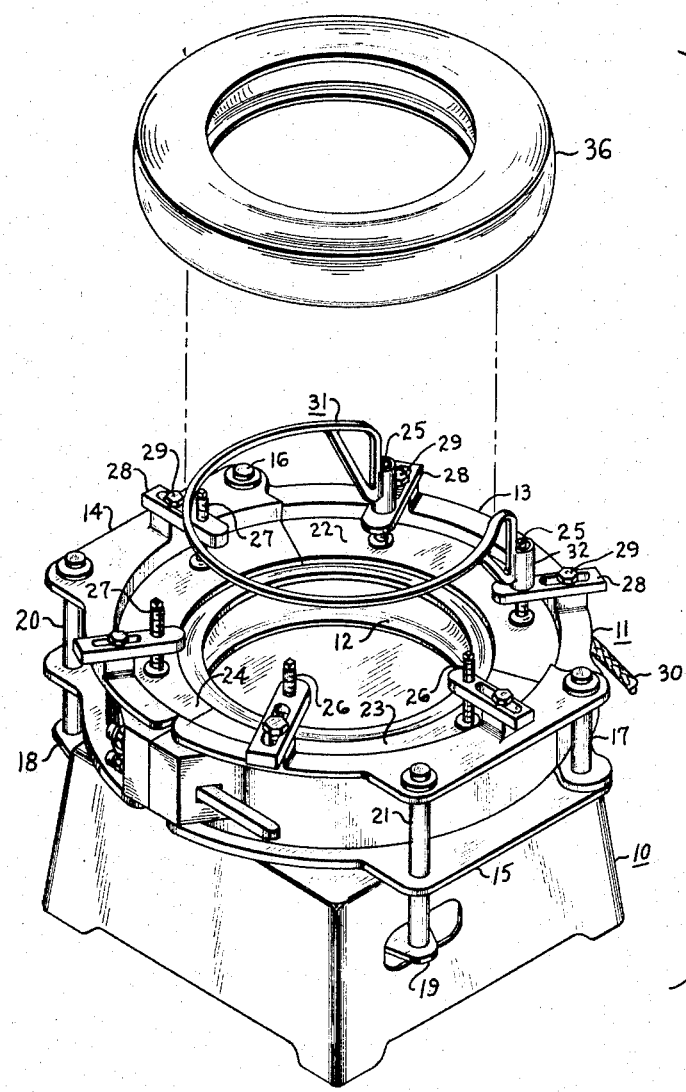
Figure 1 is a view in perspective of a tire-recapping mold adapted for the practice of my invention, a prepared tire being shown in displaced relation thereto.
Figure 2:
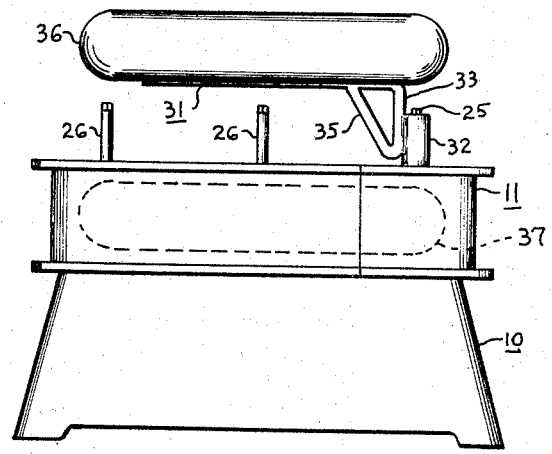
Figure 2 is a side elevation view of a tire-recapping mold adapted for the practice of my invention, a prepared tire being shown in place thereon, the mold proper being shown in simplified form, and the position of a tire being vulcanized in such mold being indicated in dotted lines.
Figure 3:
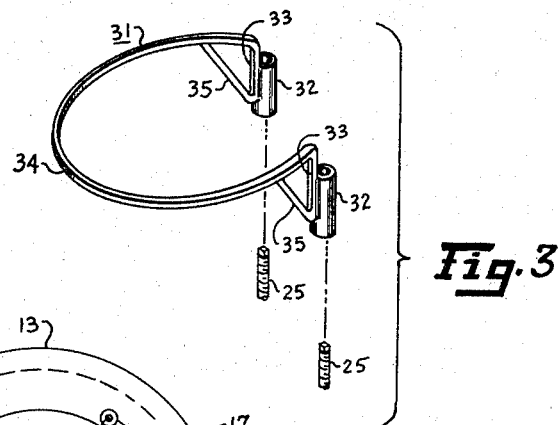
Figure 3 is a fragmentary perspective view of the tire-holding support portion of the mold of Figures 1 and 2, the mounting studs therefor being shown in part.

Referring to the drawings, I have shown my invention as incorporated in a tire recapping mold including a base portion 10 and a mold portion 11 having an annular molding chamber 12 therein.

The mold portion 11 is generally ring-shaped in form and includes three arcuate sections 13, 14, and 15. As shown particularly in Figure 4, two sections, 14 and 15, are adapted to pivot outwardly about the pivots 16 and 17 to facilitate the insertion or removal of a tire in the molding chamber 12. The opening and closing mechanism (not shown) is contained in the base 10 and transmits motion to the sectors 14 and 15 by the agency of arms 18 and 19 connected to posts 20 and 21.

Each sector 13, 14, and 15, contains a removable matrix 22, 23, and 24, having an embossed pattern and adapted to impress a tread pattern on a tire inserted therein. Each matrix section is held in place in the sectors 13, 14 and 15 by matrix clamping bolts 25, 26, and 27, there being two such bolts to each sector, threadedly engaged in the arms 28 which in turn are anchored to the frame of each sector by bolts 29.

The mold portion 11 and its molding chamber 12, together with matrices 22, 23, and 24, are adapted to be heated by suitable means such as by steam introduced into inner chambers (not shown) through pipe 30. It will be understood however that the particular means chosen to heat the mold 11 is not critical to the present invention, and other means such as electricity may be used if desired.

A generally circular tire supporting bracket 31 is supported immediately above the molding chamber 12 by means of two tubular portions 32 which are fitted over the bolts 25 respectively and rest on the arms 28. The tubular portions 32 are rigidly attached by suitable means such as by welding, to integral down-turned portions 33 of the support 31.

The support 31 is preferably formed of a relatively thin rod of high strength metal such as wrought iron. It is preferably formed of one continuous piece, comprising a generally circular supporting portion, down-turned portions 33, and return-bent bracing portions 35. The structure described and shown provides a support of adequate strength to support one or more tires but still does not mask any appreciable portion of a tire supported thereon from the heat of the mold below it.

The support 31 is adapted to be mounted on and removed from the matrix clamping bolts 25 by simple vertical movement. The tubular portions 32 may be moved toward or away from each other a small amount due to the resilience of the support portion 34, to compensate for any minor differences in spacing between the bolts 25 and the portions 32 in the unmounted condition.

The bracket 31 is adapted to support a tire such as 36 thereon immediately above the mold 11. When supported in this position, the tire 36 is in position to be thoroughly heated by radiated and convected heat from the mold 11, which may contain a preceding processed tire, such as 37, therein.

According to my improved tire recapping molding method, with which the improved mold shown is adapted to be used, as soon as a tire such as 37 is placed within the mold 11 in order to vulcanize a renewed tread surface thereon, a second tire which has been properly prepared and provided with a strip of unvulcanized rubber on the periphery thereof, is placed on the support 31 and allowed to remain there during the time that the first tire is being heated and vulcanized.

During such time, the tire 36 is thoroughly pre-heated as described above. Such pre-heating dries out any moisture which may be trapped in the tire and which might otherwise interfere with the molding and vulcanizing functions. It "pre-shrinks" tires which contain certain synthetic fibers which may have become elongated in use. It also improves the quality of the tread impression formed in the molding operation and the sharpness of the many edges formed therein.

Figure 4:
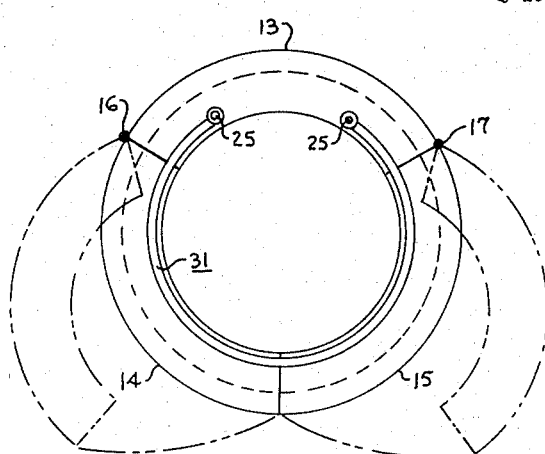
Figure 4 is a simplified top plan view of a tire recapping mold incorporating my invention, the open position of the movable portions thereof being shown in dotted lines.

Upon completion of the molding cycle for the first tire, such as 37, the mold is opened in the manner shown in Figure 4, the tire 37 is removed and the tire 36 is immediately placed in the mold which is then reclosed and the second cycle begun. Thus no appreciable time is lost between molding cycles during which the mold must be left unused. Another prepared tire is then placed on the support 31, and the process repeated.

It will be observed that the support 31 is mounted on the mold 11 on the stationary sector 13 thereof, and so does not interfere with the mold opening and closing, as illustrated in Figure 4. The position and arrangement of the support 31 also is such as not to interfere with the removal of a tire from the molding chamber or the subsequent insertion of a tire therein, such tire being moved essentially horizontally during such removal and insertion. If necessary however, such as for the purpose of changing the matrices, the support 31 may readily be removed by sliding it off the bolts 25.

While I have illustrated a particular embodiment of my invention, including a particular type of molding chamber and mold proper, it will be understood that numerous modifications thereof may readily be made by those skilled in the art, such as to permit the practice of my invention with other types of basic molding units. Thus for instance if no matrix clamping bolts such as bolts 25 were available, other bolts similarly positioned could be utilized or provided or other supporting means used for holding the support 31 in place over the molding chamber without departing from the spirit and scope of my invention. I intend therefore by the appended claims to cover all such modifications as fall within the true spirit and scope of my invention.

I claim:

1. A tire recapping mold comprising an openable molding chamber for receiving a first tire, means for impressing a tread design thereon, heating means for heating said tire, and means for supporting a second tire immediately above said molding chamber whereby said second tire is pre-heated by radiated and convected heat from said molding chamber while said first tire is being vulcanized, said second tire-supporting means comprising a rod-like tire supporting portion of generally circular configuration extending in a plane generally parallel to the plane of said first tire when in the molding chamber and having its center substantially directly above the center of said first tire.

2. A tire recapping mold comprising an openable molding chamber for receiving a first tire to be vulcanized, means for impressing a tread design thereon, heating means for heating said tire when in said molding chamber, and a tire supporting bracket having a rod-like tire supporting portion of generally circular configuration extending in a plane generally parallel to the plane of said first tire when in said molding chamber and having its center substantially directly above the center of said first tire, and means for removably supporting said tire supporting bracket on said mold.

3. Tire recapping apparatus comprising a main molding portion having a generally horizontal annular molding chamber therein, said chamber being openable to permit the insertion and removal of a tire therein and therefrom respectively by movement along a predetermined horizontal path, means in said chamber for impressing a tread design on a tire in said chamber, heating means for heating said tire in said chamber, and tire-supporting means including an unenclosed portion above said main molding portion for supporting a tire in a generally horizontal position with its center substantially directly above the center of said molding chamber with said tire out of said path of movement and with the major portion of one side of said tire exposed directly to thermal radiation from said main molding portion.

References Cited in the file of this patent

UNITED STATES PATENTS

| | | | |
|---|---|---|---|
| 875,533 | Lane | Dec. 31, | 1907 |
| 1,226,236 | Meyer | May 15, | 1917 |
| 1,394,928 | Midgley et al. | Oct. 25, | 1921 |
| 1,583,233 | Leon | May 4, | 1926 |
| 2,085,206 | Holmdahl | June 29, | 1937 |
| 2,345,172 | Bacon | Mar. 28, | 1944 |
| 2,445,701 | Vogt | July 20, | 1948 |
| 2,542,118 | Christman | Feb. 20, | 1951 |